(12) United States Patent
Avva et al.

(10) Patent No.: US 11,849,383 B2
(45) Date of Patent: Dec. 19, 2023

(54) ROUTING PACKETS IN A DATA NETWORK

(71) Applicant: Cambium Networks Ltd, Ashburton (GB)

(72) Inventors: Kiran Avva, Karnataka (IN); Rupam Khaitan, Rolling Meadows, IL (US); Yonghao Lin, South Barrington, IL (US)

(73) Assignee: Cambium Networks Ltd, Ashburton (GB)

( * ) Notice: Subject to any disclaimer, the term of this patent is extended or adjusted under 35 U.S.C. 154(b) by 0 days.

(21) Appl. No.: 17/843,498

(22) Filed: Jun. 17, 2022

(65) Prior Publication Data
US 2023/0009508 A1 Jan. 12, 2023

(30) Foreign Application Priority Data
Jun. 18, 2021 (IN) .............................. 202121027404

(51) Int. Cl.
*H04W 40/24* (2009.01)
*H04L 45/00* (2022.01)
*H04L 45/741* (2022.01)
*H04L 45/748* (2022.01)

(52) U.S. Cl.
CPC .......... *H04W 40/248* (2013.01); *H04L 45/66* (2013.01); *H04L 45/741* (2013.01); *H04L 45/748* (2013.01)

(58) Field of Classification Search
CPC .... H04W 40/248; H04L 45/66; H04L 45/741; H04L 45/748
See application file for complete search history.

(56) References Cited

U.S. PATENT DOCUMENTS

2006/0053231 A1* 3/2006 Lange ................. H04L 43/0811
709/239
2019/0273727 A1* 9/2019 Eckert ................... H04L 63/166

FOREIGN PATENT DOCUMENTS

WO 2017066574 4/2017

OTHER PUBLICATIONS

International Search Report and Written Opinion of the ISA issued in corresponding Application No. PCT/EP2022/066579 dated Oct. 24, 2022 (16 pages).

(Continued)

Primary Examiner — Jianye Wu
(74) Attorney, Agent, or Firm — Crowell & Moring LLP

(57) ABSTRACT

Packets are routed in a data network comprising a wireless mesh network and a controller providing IPv6 management traffic to nodes of the wireless network. A monitor function and a route table manager are used to generate a route table relating IPv6 addresses to each of the nodes via a respective one of a plurality of POP nodes, by accessing a pre-configured topology file, determining the reachability of each of the plurality of POP nodes from the controller by periodically sending test messages from the monitor function to each POP and detecting acknowledgement of the test messages. If a POP node is not reachable, the route table is updated to relate the IPv6 subnet of the POP that is not reachable to the address of a POP node that is reachable. A Layer 2 network is used to direct the IPv6 management traffic according to the amended route table.

20 Claims, 17 Drawing Sheets

(56) References Cited

OTHER PUBLICATIONS

"Eckert T et al: ""An Autonomic Control Plane (ACP); rf08994.txt"", An Autonomic Control Plane (ACP); RFC8994.TXT, Internet Engineering Task Force, IETF; Standard, Internet Society (ISOC) 4, Rue Des Falaises CH—1205 Geneva, Switzerland, May 22, 2021 (May 22, 2021), XP015146222, Retrieved from the Internet: URL:https://tools.ietf.org/html/rf08994" (128 pages).

United Kingdom Intellectual Property Office Search Report issued in corresponding Patent Application GB2208922.1, dated Nov. 28, 2022 (4 pages).

\* cited by examiner

Route table generated by route table manager using data from configuration file of controller.

| Prefix | | Gateway |
|---|---|---|
| Seed prefix 1 | Zone prefix 1 | POP1 |
| Seed prefix 1 | Zone prefix 2 | POP2 |
| Seed prefix 1 | Zone prefix 3 | POP3 |
| Seed prefix 1 | | POP1 (default) |

Short prefix

Long prefix

Select route by longest prefix match

Route table amended by route table manager on basis of responses to test messages

| Prefix | | Gateway |
|---|---|---|
| | | |
| Seed prefix 1 | Zone prefix 2 | POP2 |
| Seed prefix 1 | Zone prefix 3 | POP3 |
| Seed prefix 1 | | POP2 (default) |

Short prefix

Long prefix

Selecting route by longest prefix match: packets with zone prefix 1 now routed via POP2

ROUTING PACKETS IN A DATA NETWORK

CROSS-REFERENCE TO RELATED APPLICATIONS

This application claims priority from Indian Application No. IN 202121027404, filed on Jun. 18, 2021, the entirety of which is hereby fully incorporated by reference herein.

TECHNICAL FIELD

The present disclosure relates to a method and apparatus for routing packets in a data network comprising a wireless mesh network, and in particular, but not exclusively, for routing Internet Protocol version 6 (IPv6) packets in a data network comprising a wireless mesh network having a plurality of point-of-presence (POP) nodes and an end-to-end (E2E) controller.

BACKGROUND

A data network may have an IPv6 Routing system in which each node has an IPv6 address. The data network may comprise a wireless mesh network comprising nodes which may be referred to as Point of Presence (POP) nodes, which typically have wired backhaul connectivity and which act as gateways to the nodes of the wireless mesh network. In one approach, an IPv6 Border Gateway Protocol (BGP) router peers with POP nodes, and an End-to-End (E2E) Controller (residing outside the mesh) centrally manages the mesh and communicates to the nodes via the BGP router. However, it may be desired not to use a BGP router, for example to reduce complexity and cost.

SUMMARY

In accordance with a first aspect there is provided a method of routing packets in a data network comprising a wireless mesh network and a controller for the wireless mesh network, the controller being outside the wireless mesh network and being in communication with a plurality of point of presence (POP) nodes of the wireless mesh network, the controller providing management traffic having Internet Protocol version 6 (IPv6) protocol to respective nodes of the wireless mesh network, the method comprising using a monitor function and a route table manager to generate a route table relating IPv6 addresses to each of the mesh nodes via a respective one of the plurality of POP nodes, by:

accessing a pre-configured topology file of the controller relating each of a plurality of IPv6 subnets to a respective POP node, each subnet relating to a respective zone of the wireless mesh network;

determining the reachability of each of the plurality of POP nodes from the controller by means of periodically sending test messages from the monitor function to each POP and detecting acknowledgement of the test messages;

dependent upon a determination that a POP node is not reachable, using the route table manager to dynamically amend the route table to relate the IPv6 subnet of the POP that is not reachable to the address of a POP node that has been determined to be reachable; and using an Open Systems Interconnection (OSI) Layer 2 network to direct the IPv6 management traffic between the controller and the respective nodes of the mesh network via the respective POP nodes according to the amended route table.

This allows the IPv6 management control traffic to be directed between the controller and the respective nodes of the wireless mesh network without the use of an external OSI Layer 3 router, such as a Border Gateway Protocol (BGP) router, outside the wireless mesh network.

In an example, each zone of the wireless mesh network corresponds to an IPv6 subnet comprises a POP node as a gateway to the respective zone, at least one distribution node and a plurality of client nodes, each zone is connected to at least one other of the zones within the mesh network, and each node in the wireless mesh network has an IPv6 address comprising a seed prefix identifying the wireless mesh network and a zone prefix identifying the respective zone, wherein the route table relates a plurality of long prefixes each comprising a seed prefix and a zone prefix to a respective POP node, and the route table relates at least one short prefix comprising a seed prefix and not a zone prefix to a default POP node, the method comprising:

dependent upon a determination that a POP node is not reachable, dynamically adjusting the route table to delete an entry relating one or more long prefixes to the POP node that is not reachable;

dependent upon a determination that the default POP node is not reachable, dynamically adjusting the route table to amend an entry relating a short prefix to the default POP node that is not reachable to instead relate the short prefix to a POP node that has been determined to be reachable; and selecting a route from the route table by selecting a longest prefix match.

This allows fault tolerant direction of packets without the use of an OSI Layer 3 router such as a BGP router.

In an example, said test messages are ICMP ping messages.

This provides a convenient form of test message.

In an example, the OSI Layer 2 network used to direct the IPv6 management traffic (4) between the controller (2) and the respective nodes of the mesh network (1) via the respective POP nodes comprises an OSI Layer 2 switch.

This provides a low complexity and low cost solution.

In an example, the controller is an End to End (E2E) controller. The End to End controller may be configured to centrally manage the wireless mesh network and communicate to the nodes of the wireless mesh network using IPv6 to send management control traffic to manage the network. The management control traffic may comprise configuration data, control of link setup and/or tear down, and collection of performance data from nodes of the wireless mesh. In accordance with a second aspect, there is provided a system for routing packets in a data network, the system comprising a wireless mesh network, and one or more processors configured to implement a controller for the wireless mesh network, a monitor function and a route table manager, the one or more processors used to implement the controller being outside the wireless mesh network and being in communication with a plurality of point of presence (POP) nodes of the wireless mesh network, the controller providing management traffic having Internet Protocol version 6 (IPv6) protocol to respective nodes of the wireless mesh network, the controller being configured to:

use the monitor function and the route table manager to generate a route table relating IPv6 addresses to each of the nodes of the mesh network via a respective one of the plurality of POP nodes, by accessing a pre-configured topology file of the controller relating each of a plurality of IPv6 subnets to a respective POP node, each subnet relating to a respective zone of the wireless mesh network, determining the reachability of each of the plurality of POP nodes from the controller by means of periodically sending test messages from the monitor function to each POP and detecting acknowledgement of the test messages, and dependent upon a determination that a POP node is not reachable, using the route table manager to dynamically amend the route table to relate the IPv6 subnet of the POP that is not reachable to the address of a POP node that has been determined to be reachable; and use an Open Systems Interconnection (OSI) Layer 2 network to direct the IPv6 management traffic between the controller and the respective nodes of the mesh network via the respective POP nodes according to the amended route table.

In accordance with a third aspect, there is provided a non-transitory computer readable storage medium storing instructions executable by one or more processors to perform a method of routing packets in a data network comprising a wireless mesh network (1) and a controller (2) for the wireless mesh network, the controller being outside the wireless mesh network (1) and being in communication with a plurality of point of presence (POP) nodes (3a, 3b, 3c) of the wireless mesh network (1), the controller (2) providing management traffic (4) having Internet Protocol version 6 (IPv6) protocol to respective nodes of the wireless mesh network (1), the method comprising:

using a monitor function (5) and a route table manager (6) to generate a route table (7) relating IPv6 addresses to each of the nodes of the mesh network via a respective one of the plurality of POP nodes, by:
  accessing a pre-configured topology file (8) of the controller relating each of a plurality of IPv6 subnets to a respective POP node, each subnet relating to a respective zone (9a, 9b, 9c) of the wireless mesh network (1);
  determining the reachability of each of the plurality of POP nodes (3a, 3b, 3c) from the controller (2) by means of periodically sending test messages (10) from the monitor function to each POP and detecting acknowledgement of the test messages;
  dependent upon a determination that a POP node is not reachable, using the route table manager (6) to dynamically amend the route table (7) to relate the IPv6 subnet of the POP that is not reachable to the address of a POP node that has been determined to be reachable; and
  using an Open Systems Interconnection (OSI) Layer 2 network (11) to direct the IPv6 management traffic (4) between the controller (2) and the respective nodes of the mesh network (1) via the respective POP nodes according to the amended route table.

Further features and advantages will become apparent from the following description of examples, which is made with reference to the accompanying drawings.

BRIEF DESCRIPTION OF THE DRAWINGS

In order that the present disclosure may be more readily understood, examples will now be described, with reference to the accompanying drawings, in which:

FIG. 5 illustrates a route table amended by route table manager on the basis of responses to test messages;

DETAILED DESCRIPTION

Examples are described in the context of a data network comprising a wireless mesh network operating with a carrier frequency of approximately 60 GHz having a plurality of point-of-presence (POP) nodes and an end-to-end (E2E) controller for the wireless network, providing Internet connectivity for a plurality of client nodes. However, it will be understood that examples may relate to other applications and wireless networks operating at any other frequency, and to wired mesh networks.

Figure 1:
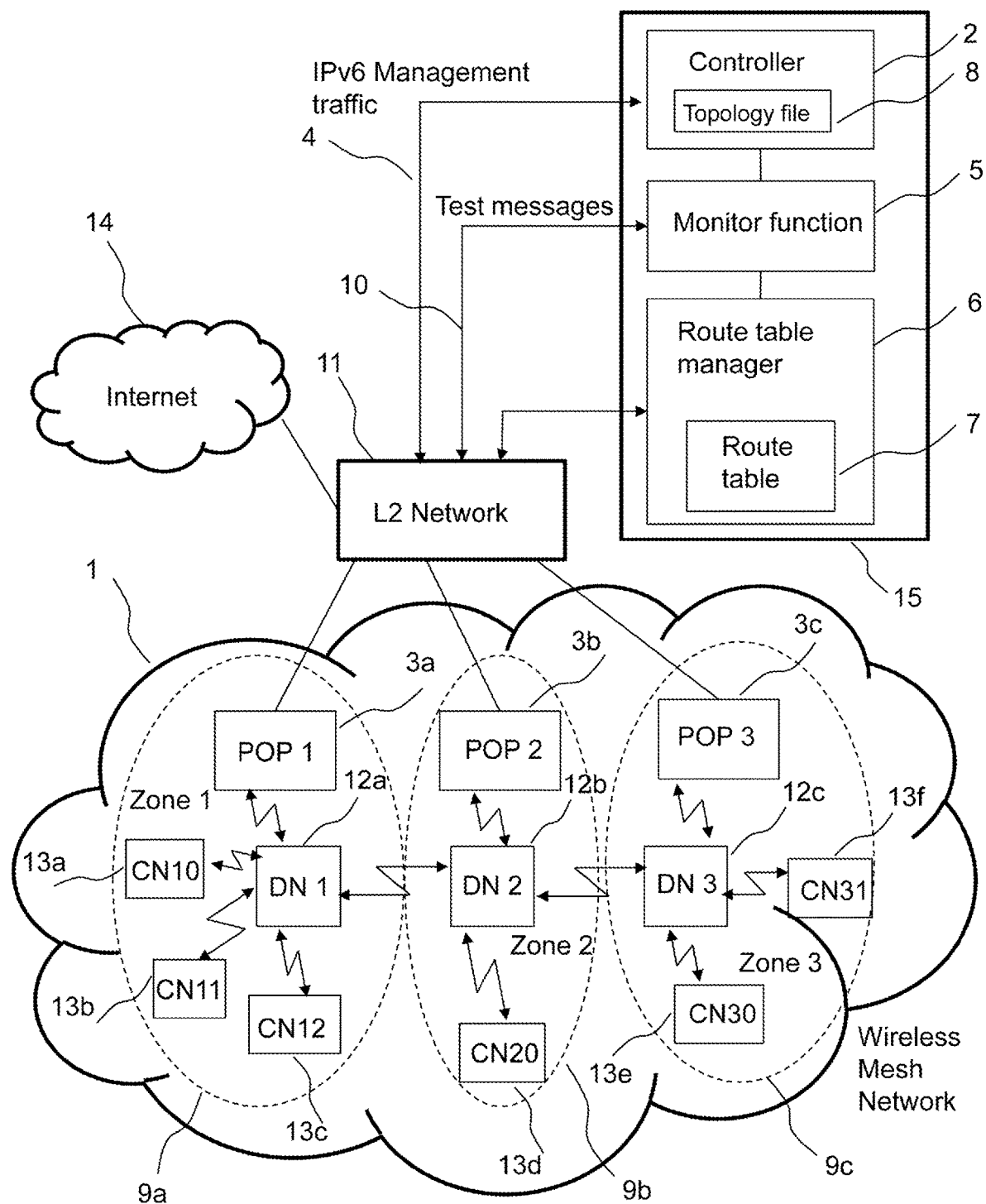
FIG. 1 is a schematic diagram showing a data network in an example.

FIG. 1 shows routing of packets in a data network comprising a wireless mesh network 1 and a controller 2 for the wireless mesh network. The controller is outside the wireless mesh network 1 and is in communication with a plurality of point of presence (POP) nodes 3a, 3b, 3c of the wireless mesh network 1. The controller may be implemented by one or more processors which are outside the wireless mesh network, for example in a Linux docker 15. The controller 2 provides management traffic 4 having Internet Protocol version 6 (IPv6) protocol to respective nodes of the wireless mesh network 1.

A monitor function 5 and a route table manager 6 is provided to generate a route table 7 relating IPv6 addresses to each of the mesh nodes of the wireless mesh network via a respective one of the plurality of POP nodes.

The monitor function and route table manager may be software functions and may, for example, be run within one or more processors within the same Linux docker 15 as is used to run the controller 2. However, the monitor function and route table manager may be run as stand-alone processes without a docker. A non-transitory computer readable storage medium may store instructions executable by the one or more processors to perform the method described herein.

The controller 2 is typically what is referred to as an End to End (E2E) controller, which is typically configured to centrally manage the wireless mesh network and communicate to the nodes of the wireless mesh network using IPv6 to send management control traffic to manage the network. The management control traffic typically comprises configuration data, control of link setup and/or tear down, and collection of performance data from nodes of the wireless mesh.

The wireless mesh network, in the example of FIG. 1, is divided into a plurality of zones 9a, 9b, 9c. Each zone of the wireless mesh network corresponds to an IPv6 subnet comprises a POP node 3a, 3b, 3c which may act as a gateway to the respective zone, at least one distribution node 12a, 12b, 12c and a plurality of client nodes 13a ... 13f. The connections between the nodes of the wireless mesh network are in this example wireless connections operating at a carrier frequency of approximately 60 GHz. Client nodes are typically sited at customer premises and are typically connected to a customer's network, such as a wired connection or WiFi, to provide, for example, Internet service to one or more of the customer's devices such as computers. As may be seen in FIG. 1, each zone is connected to at least one other of the zones within the mesh network.

Each node in the wireless mesh network has an IPv6 address comprising a seed prefix identifying the wireless mesh network and a zone prefix identifying the respective zone. The route table relates a plurality of long prefixes each comprising a seed prefix and a zone prefix to a respective POP node, and the route table relates at least one short prefix comprising a seed prefix and not a zone prefix to a default POP node.

The monitor function 5 and a route table manager 6 generate a route table 7 relating IPv6 addresses to each of the mesh nodes via a respective one of the plurality of POP nodes, by accessing a pre-configured topology file 8 of the controller relating each of a plurality of IPv6 subnets to a respective POP node, each subnet relating to a respective zone (9a, 9b, 9c) of the wireless mesh network 1. The topology file 8 may, for example, be manually entered by a network operator.

An Open Systems Interconnection (OSI) Layer 2 network 11, typically comprising an OSI Layer 2 switch, is used to direct the IPv6 management traffic 4 between the controller 2 and the respective nodes of the mesh network 1 via the respective POP nodes according to the route table.

Figure 2:
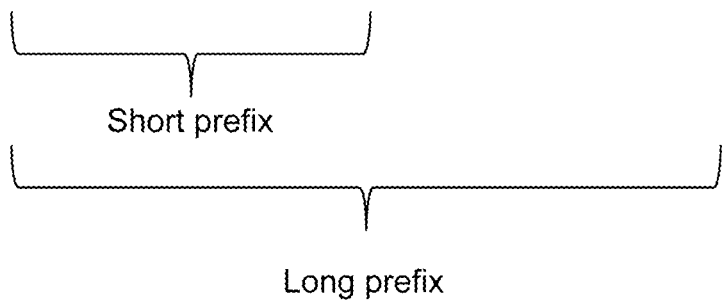
FIG. 2 illustrates a route table generated by route table manager using data from the configuration file of the controller.

FIG. 2 shows a route table generated by the route table manager using data from the configuration file of the controller. A route is selected according to a longest prefix match. In this illustrated example, any traffic having the seed prefix 1, indicating the wireless mesh network, and any of the zone prefixes 1, 2 or 3, would be routed via the indicated respective POP.

Figure 3:
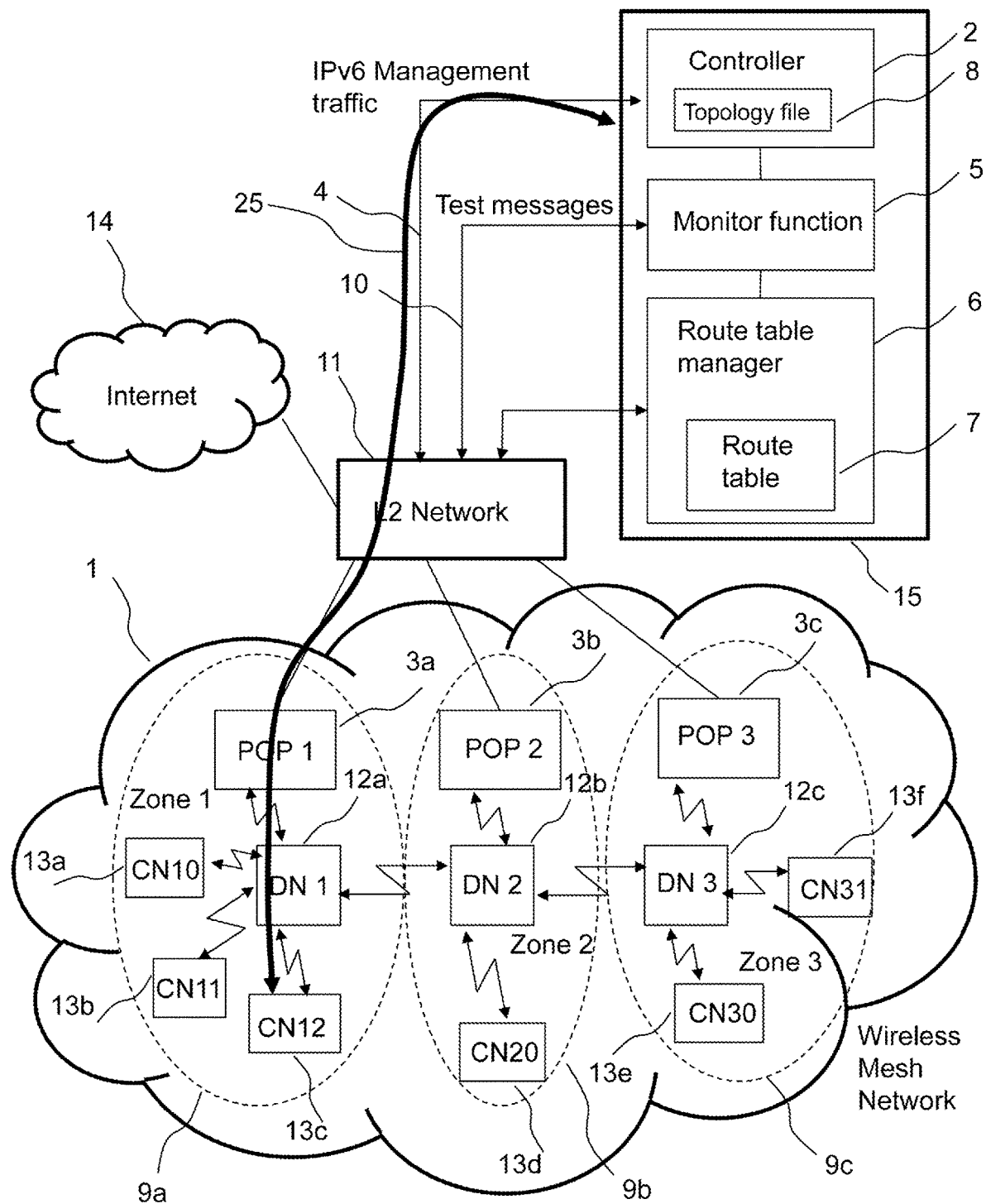
FIG. 3 shows the data network of FIG. 1, illustrating an example of a route for management traffic initially set up by the route table manager based on data in the topology file of the controller.

FIG. 3 shows an example of a route 25 for management traffic initially set up by the route table manager based on data in the topology file of the controller.

Figure 4:
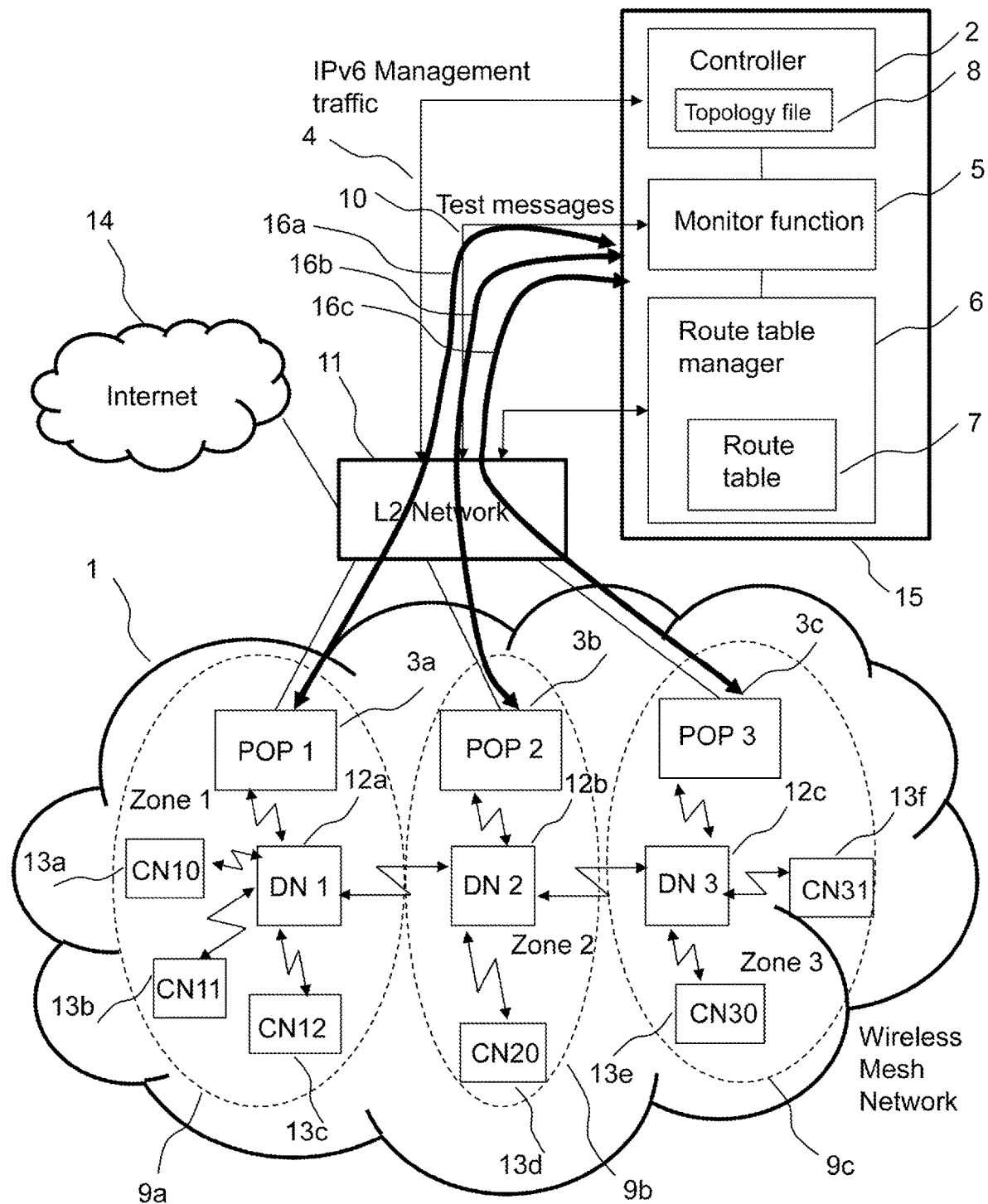
FIG. 4 shows the data network of FIG. 1, illustrating test messages sent by the monitor function.

FIG. 4 shows the data network of FIG. 1, illustrating the routes 16a, 16b, 16c of test messages sent by the monitor function 5. The reachability of each of the plurality of POP nodes 3a, 3b, 3c from the controller 2 is determined by means of periodically sending the test messages 10 from the monitor function to each POP and detecting acknowledgement of the test messages. The test messages are typically ICMP ping messages.

If it is determined that a POP node is not reachable, the route table manager 6 dynamically amends the route table 7 to relate the IPv6 subnet of the POP that is not reachable to the address of a POP node that has been determined to be reachable. This may be done by, dependent upon a determination that a POP node is not reachable, dynamically adjusting the route table to delete an entry relating one or more long prefixes to the POP node that is not reachable. Also, dependent upon a determination that the default POP node is not reachable, the route table is dynamically amended to amend an entry relating a short prefix to the default POP node that is not reachable to instead relate the short prefix to a POP node that has been determined to be reachable.

FIG. 5 illustrates an example of a route table amended by route table manager on the basis of responses to test messages, in the example where POP1 is not reachable from the controller. In this example, the entry relating zone prefix 1 to POP1 is deleted. The entry relating seed prefix 1 as a short prefix (in combination with any zone prefix) to POP1 as a default node has been updated to relating seed prefix 1 to POP2 as a default node. A route is selected from the route table by selecting a longest prefix match. So, packets with zone prefixes 2 or 3 would be routed via POP2 and POP5 respectively as previously. However, a packet with zone prefix 1 would not achieve a long prefix match in the table, and so the short prefix match would be selected and the packet would be routed via default POP2.

Figure 6:
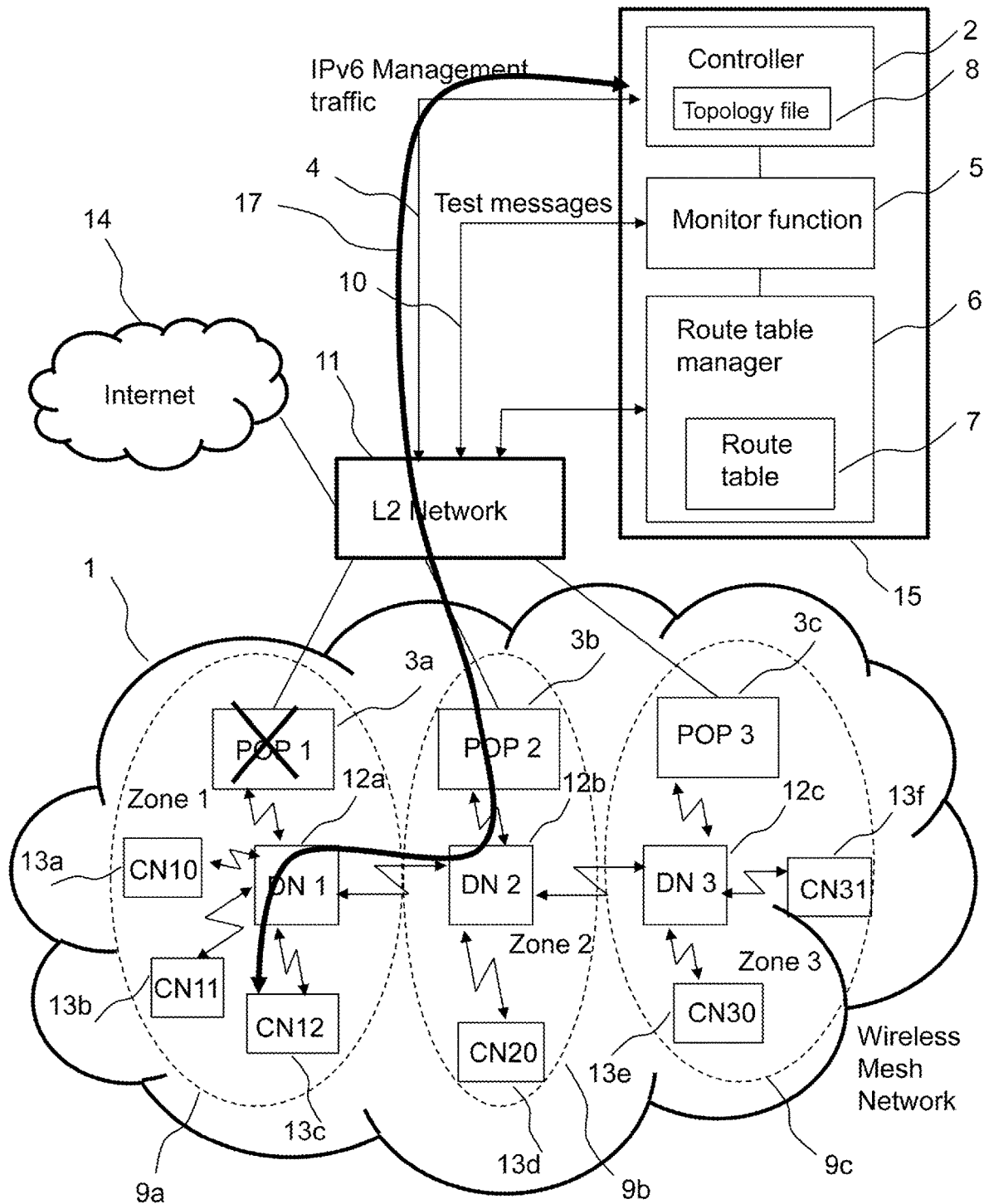
FIG. 6 shows the data network of FIG. 1, illustrating an example of a route for management traffic based on an amended route table updated by the route table manager based on the acknowledgements and lack of acknowledgements to the test messages, in the case where POP1 is unreachable.

FIG. 6 shows the data network of FIG. 1, illustrating an example of a route 17 for management traffic based on an amended route table updated by the route table manager based on the acknowledgements and lack of acknowledgements to the test messages, in the case where POP1 is unreachable.

In each case, the Open Systems Interconnection (OSI) Layer 2 network 11 is used to direct the IPv6 management traffic 4 between the controller 2 and the respective nodes of the mesh network 1 via the respective POP nodes according to the route table, amended as appropriate according to the results of the reachability tests using the test messages. This allows the IPv6 management control traffic to be directed between the controller 2 and the respective nodes of the wireless mesh network 1 without the use of an external OSI Layer 3 router, such as a BGP router, outside the wireless mesh network 1.

Figure 7:
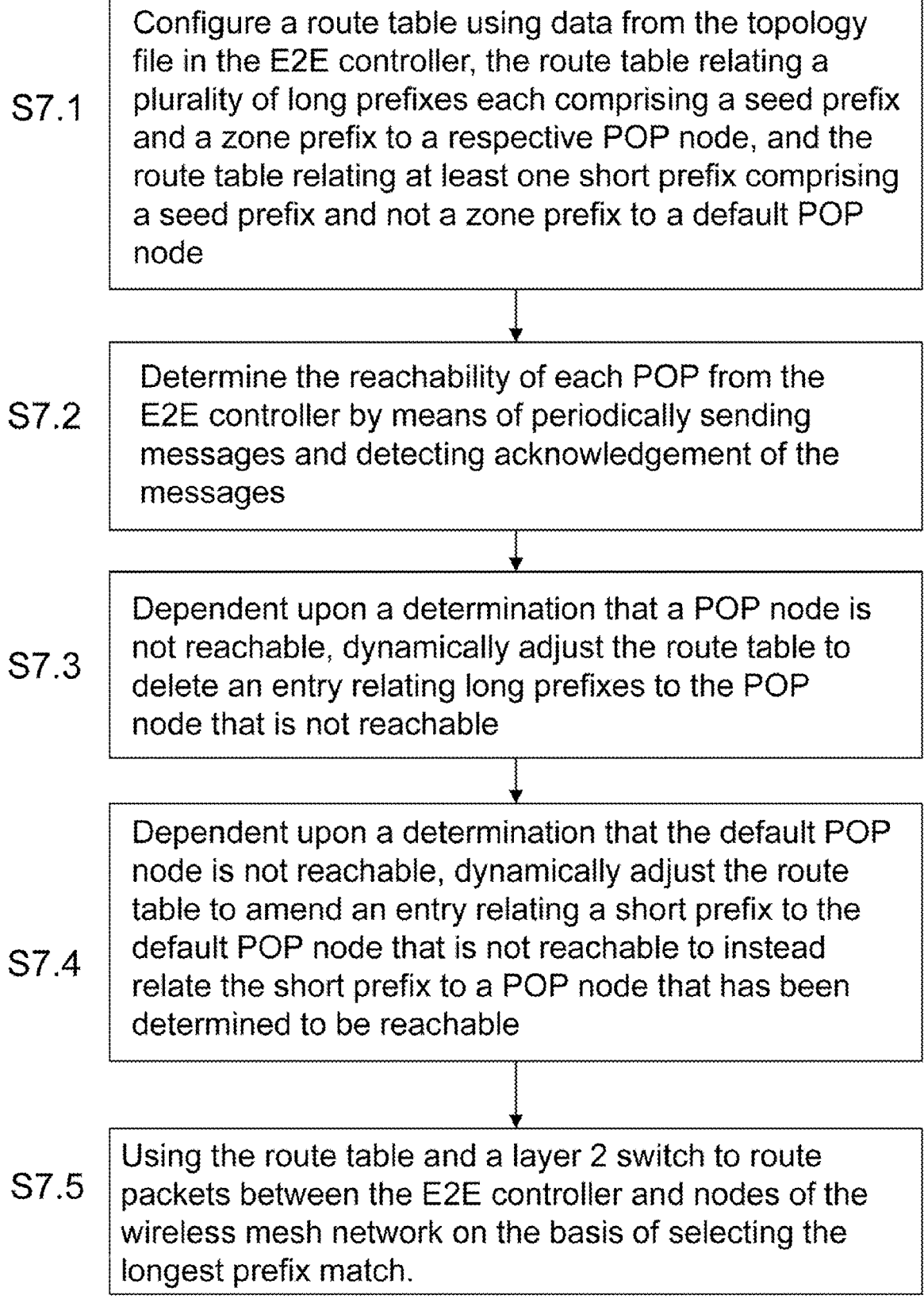
FIG. 7 is a flow diagram of a method according to an example.

FIG. 7 is a flow diagram of a method according to an example, according to steps S7.1 to S7.5.

Figure 8:
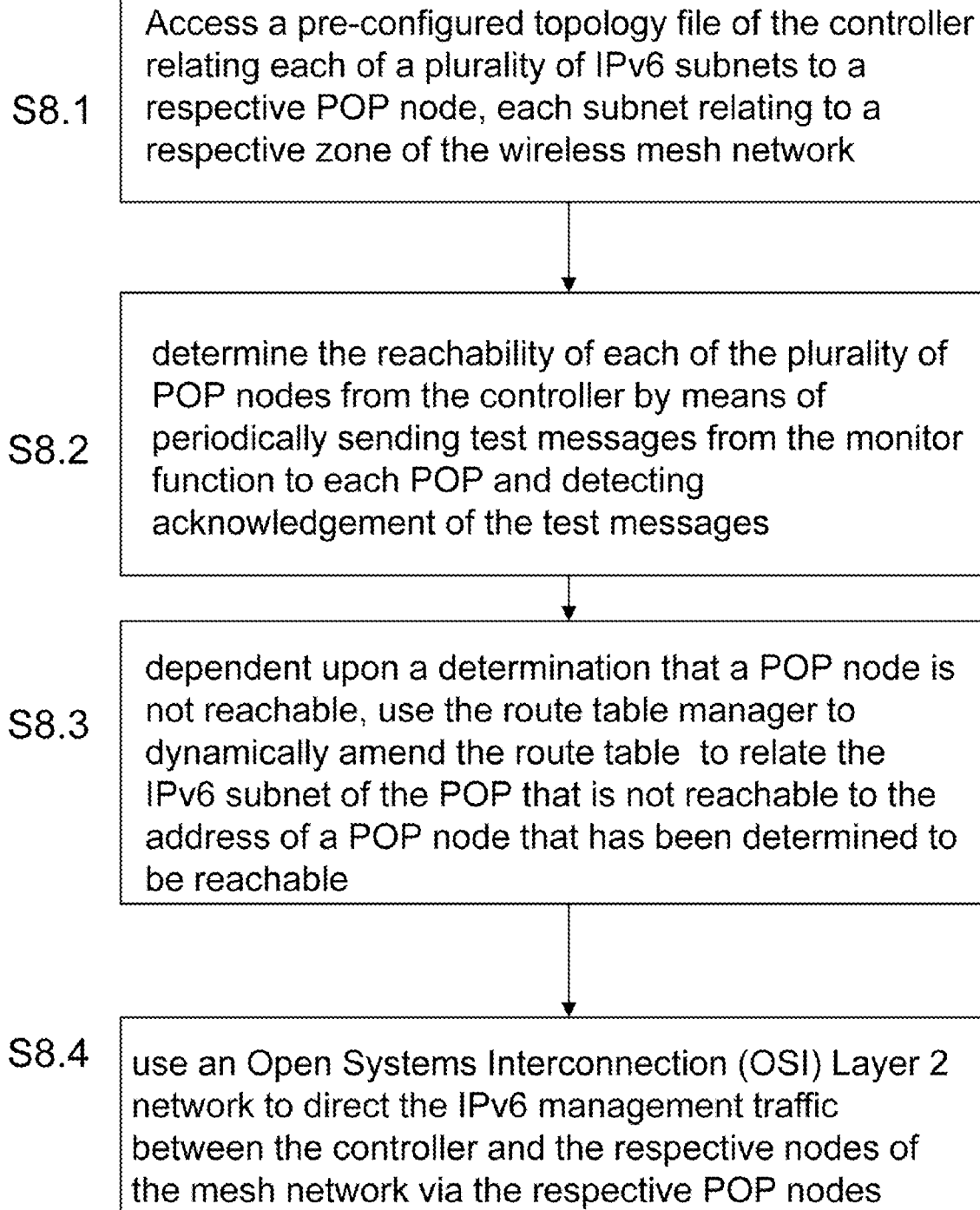
FIG. 8 is a flow diagram of a method according to an example.

FIG. 8 is a flow diagram of a method according to an example, according to steps S8.1 to S8.4.

In the foregoing, in an example the wireless mesh network consists of POP nodes, which are nodes at which backhaul wired access is typically present. These are entry points to a mesh; distribution nodes, which are intermediate nodes that distribute bandwidth to neighbouring nodes; and client nodes, which may terminate IP connectivity to a customer and wireless connect to a distribution node. The E2E controller is outside of mesh and typically manages the whole network. Each network has seed prefix, and every mesh node is assigned an IPv6 address derived from seed prefix. POP nodes have an additional IP (Internet Protocol address) on the wired interface (interface IP). Interface IPs of all POPs will typically be in the same prefix/subnet. Overall, there are two prefixes in the mesh—Seed Prefix and Interface prefix.

In a multi-POP network, a deterministic prefix algorithm may be used to subdivide the prefix into zones and each POP acts as gateway to a zone.

If a BGP router were to be used, POPs would also act as a BGP Peer to an external BGP router. Each POP would advertise the zone prefix, thereby allowing the external BGP router to route the packets through correct POP. Border Gateway Protocol (BGP) is a standardized exterior gateway protocol designed to exchange routing and reachability information among autonomous systems (AS) on the Internet. BGP is classified as a path-vector routing protocol, and it makes routing decisions based on paths, network policies, or rule-sets configured by a network administrator. When a BGP router is not used, this method cannot typically be used.

The E2E controller may, in one example, run in a docker on a Linux machine and communicates with all the nodes. The wireless mesh network is typically a Layer 3 IPv6 based network which requires IPv6 routing for user data traffic and management traffic. The E2E controller uses IPv6 to send management control traffic to manage the network (e.g. configuration, link setup/tear down, collect performance data, etc.). IPv6 is used for mesh routing and there are many IPv6 subnets in the mesh network.

Customers may prefer to operate the network as Layer 2 network without knowledge of IPv6 so total cost of ownership is reduced and network usability is improved due to: no need of addition IPv6 router (e.g. BGP router, lower equipment cost); reduced network complexity (lower operating and maintenance cost); and the network being allowed to send any type of layer traffic (not just IPv6).

As described in the foregoing, the solution provided, in an example, is to route IPv6 packets in a data network comprising a wireless mesh network having a plurality of point-of-presence (POP) nodes and an end-to-end (E2E) controller for the wireless network, each POP node being connected via a layer 2 connection to the E2E controller for the wireless mesh network. In an example, the E2E controller has a topology file representing the topology of the mesh network, and the mesh network is divided into a plurality of zones, each zone corresponding to an IPv6 subnet. In an example, each IPv6 subnet comprises a POP node as a gateway to the respective zone, at least one distribution node and a plurality of client nodes, each zone being connected to at least one other of the zones within the mesh network, and each node in the wireless mesh network has an address comprising a seed prefix identifying the wireless mesh network and a zone prefix identifying the respective zone. A route table and a layer 2 switch are used to route packets between the E2E controller and nodes of the wireless mesh network.

In an example, the route table is configured using data from the topology file in the E2E controller. The route table relates to a plurality of long prefixes each comprising a seed prefix and a zone prefix to a respective POP node, and the route table relates at least one short prefix comprising a seed prefix and not a zone prefix to a default POP node. The reachability of each POP from the E2E controller is determined by means of periodically sending messages and detecting acknowledgement of the messages. Dependent upon a determination that a POP node is not reachable, the route table is dynamically adjusted to delete an entry relating long prefixes to the POP node that is not reachable and dependent upon a determination that the default POP node is not reachable, the route table is dynamically adjusted to amend an entry relating a short prefix to the default POP node that is not reachable to instead relate the short prefix to a POP node that has been determined to be reachable. The messages may be ICMP ping messages.

The E2E controller may not be dependent on a BGP router, rather a dynamic routing table is maintained. It typically uses ICMP ping to keep track of aliveness of the POP nodes, uses zones created by Deterministic prefix allocation and dynamically updates the routing table. This allows the E2E controller to communicate with devices in a different subnet without a IPv6 router and allows operators with no IPv6 knowledge to use Multi POP deployments. Multi POP deployments allow redundancy.

Figure 9:
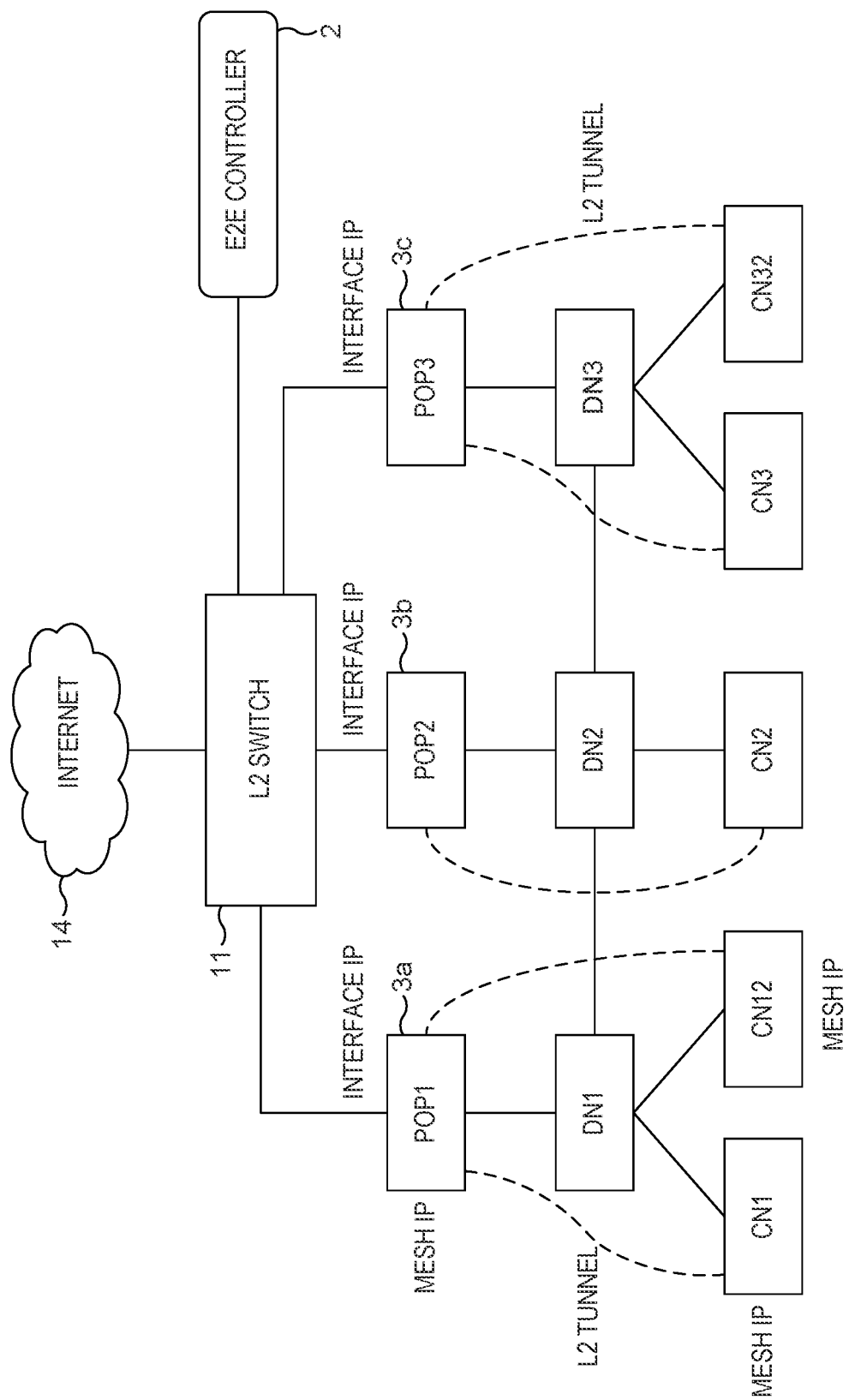
FIG. 9 is a schematic diagram showing a data network according to an example.

FIG. 9 shows a data network without a BGP router, in an example. The network supports Layer 2 bridge functionality by creating Layer 2 tunnels from each mesh node to the POP in that zone. This allows to transport layer 2 packet from customer equipment to the upstream network. POPs connect to a Layer2 switch, rather than BGP Router. The E2E controller docker may be placed in the same subnet as POP and connects to L2 switch. In an example, two Linux services are be introduced in the docker hosting the E2E controller: 'Monitor' service (MON) which monitors each POP and maintains the reachability; and 'Route table manager' service (RTM) which builds the routing table based on topology, and dynamically adjusts the routing table based on the POP reachability.

In an example, the E2E Controller maintains the topology of the mesh in a file called topology.conf. The topology includes the information on nodes and zones. The RTM periodically reads the reads the topology and builds the routing table. An example of the table for a mesh with three POPs is as follows.

| | Prefix Gateway | Gateway |
|---|---|---|
| 1 | Zone Prefix 1 | POP1 |
| 2 | Zone Prefix 2 | POP2 |
| 3 | Zone Prefix 3 | POP3 |
| 4 | Seed Prefix | Any reachable POP, say POP1 |

As routing selects a rule based on the longest prefix match, one of the first three rules will hit and fourth would not hit. Note that the seed prefix is sub divided into zone prefixes. The monitor function, MON, checks the reachability of POPs, informs RTM of any change.

Consider the scenario of POP1 going down and no longer reachable. MON inform RTM. RTM adjust the routing table by removing rule #1 in above table and replacing POP 1 in rule #4 with a reachable POP, say POP2. An example of the new table is as follows.

| | Prefix Gateway | Gateway |
|---|---|---|
| 1 | Zone Prefix 2 | POP2 |
| 2 | Zone Prefix 3 | POP3 |
| 3 | Seed Prefix | Any reachable - POP2 |

In the example, any packet destined to a node in Zone 1 will hit new rule #3 and gets routed via POP2. When POP1 comes up and is reachable again, MON inform RTM and RTM adjusts the routing table. Resultant table will have four rules like the original route table.

With this solution, E2E to mesh node communication works fine without requiring a BGP router.

Figure 10:
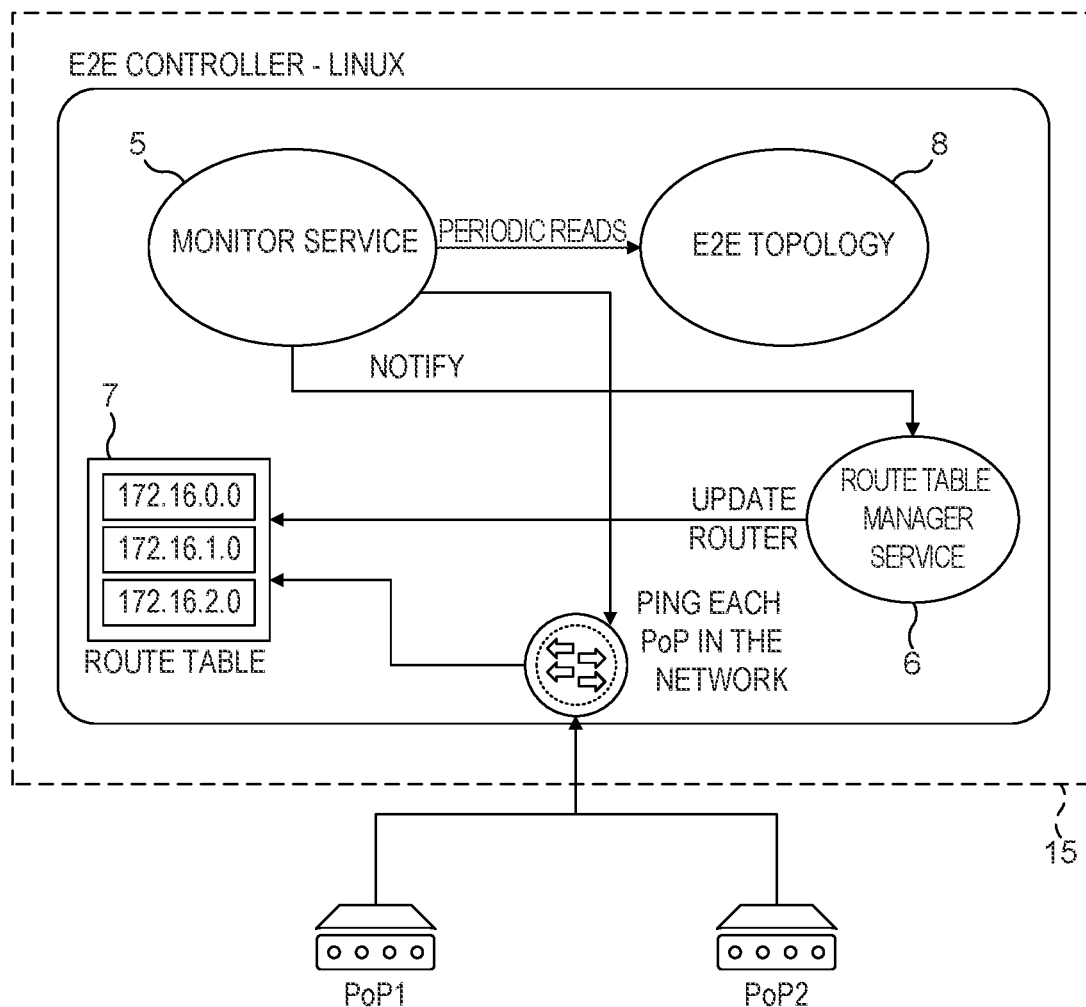
FIG. 10 is a schematic diagram showing an example of data flow in a data network according to an example.
Figure 11A:
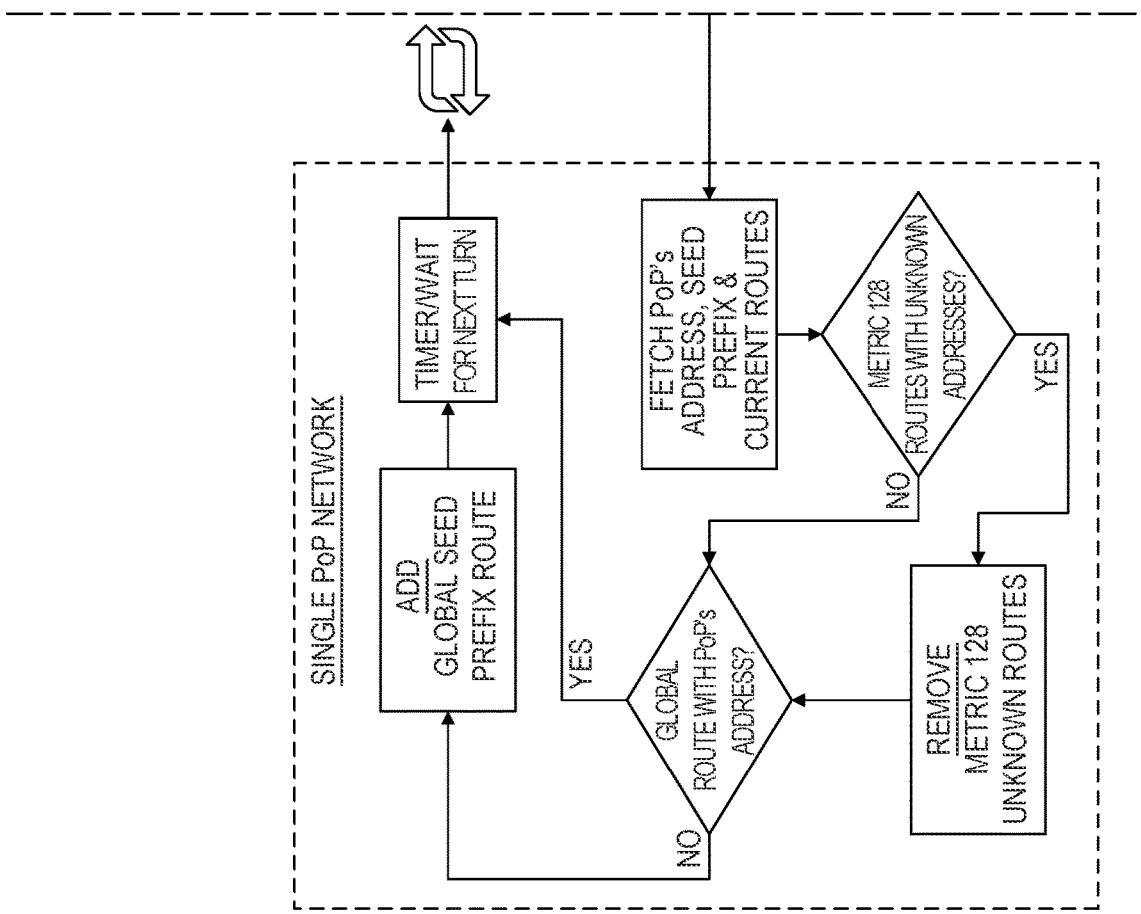
FIGS. 11a, 11b, 11c, and 11d provide a flow diagram in an example.
Figure 11B:
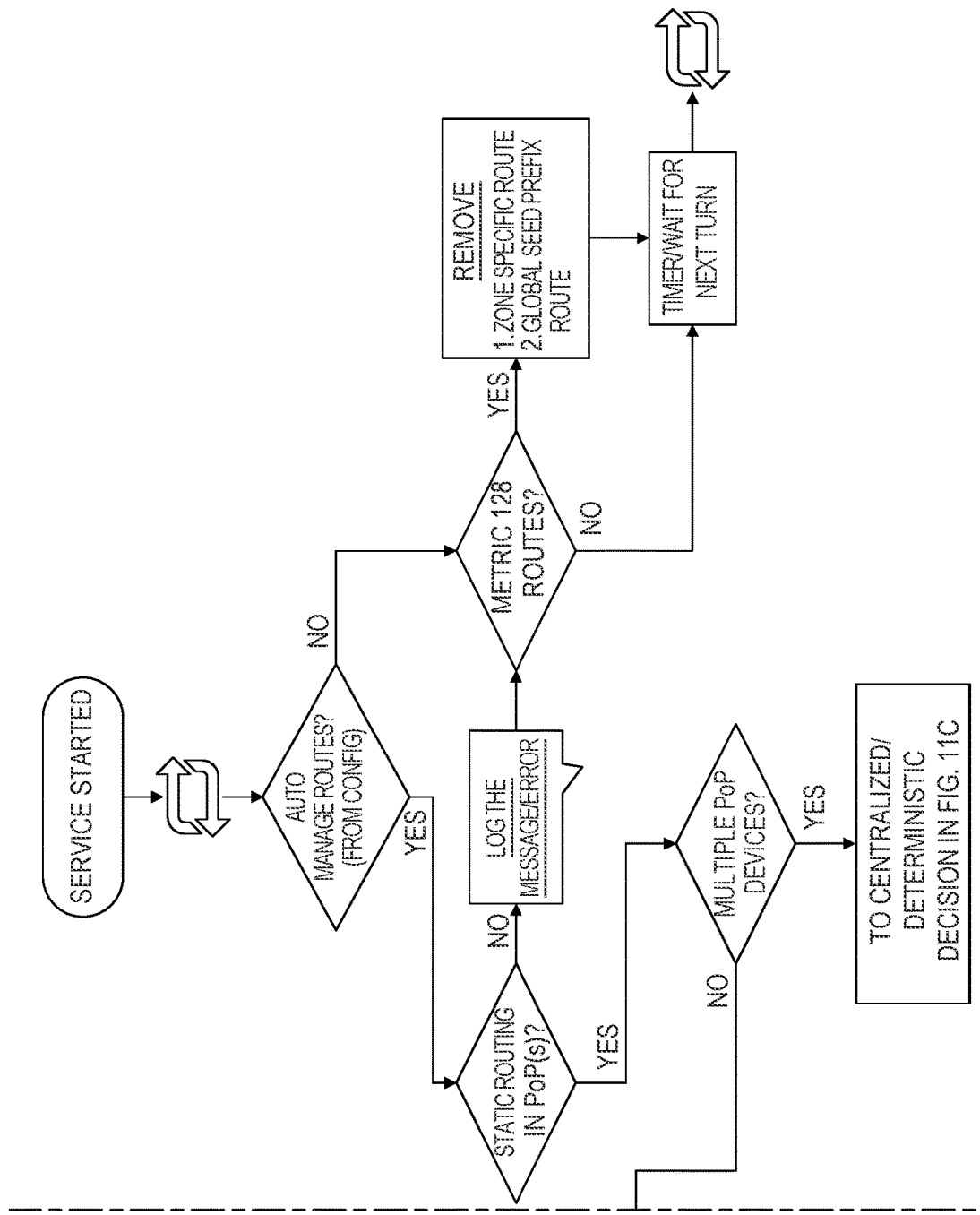
Figure 11C:
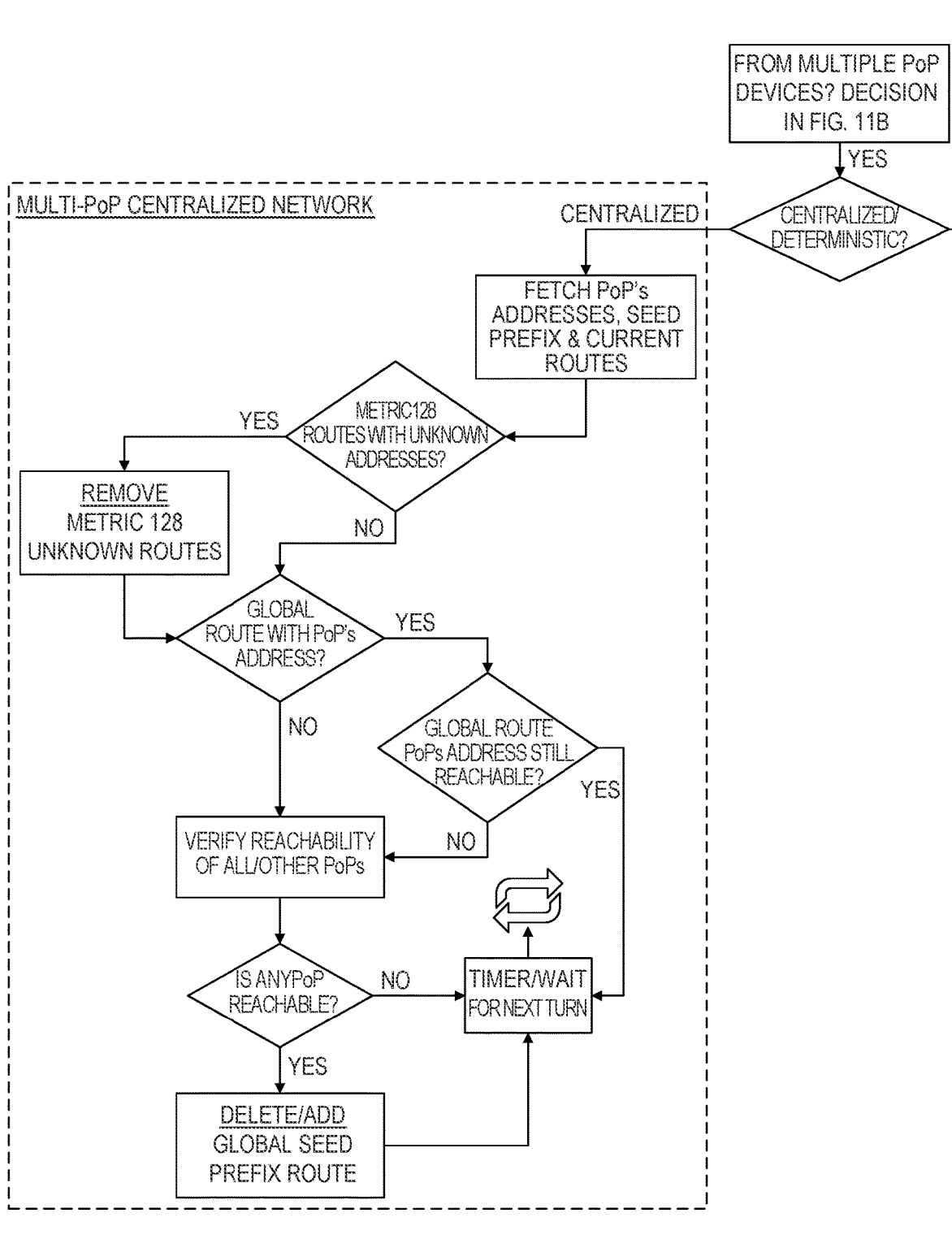
Figure 11D:
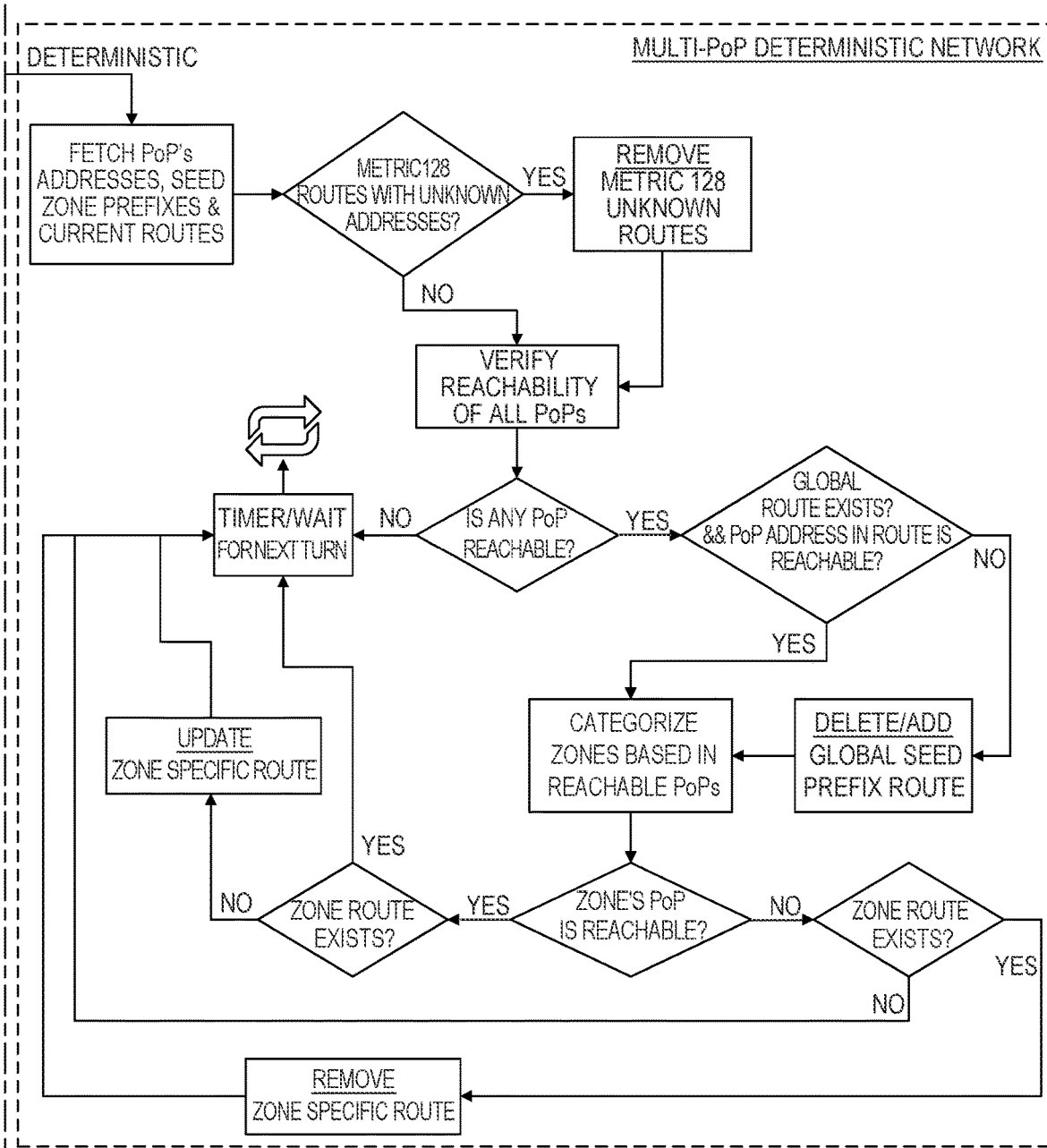

FIG. 10 is a schematic diagram showing an example of data flow in a data network according to an example.

In the example, the routes configuration in External E2E Controller is monitored and auto managed based on customer's configuration information like Prefix Allocation, Number of POP devices, Network Seed Prefix & Zone Seed Prefixes. This is applicable when the customer chooses either of the following in network and POP configuration and auto manage routes option: Centralized (i.e. preconfigured) & Static Routing; or Deterministic & Static Routing.

FIGS. 11a, 11b, 11c, and 11d show an example of operation of the monitor service. The monitor service may be a daemon which runs in the background periodically collecting configuration changes and pinging each POP node which is currently onboarded into the E2E Controller. Ping interval can be 5 consecutive pings with 2 attempts depending on the configuration of the service.

The monitor service will read the customer choice and no of pops with seed prefix information and act as follows.

If auto manage option is false or static routing is not chosen, the monitor service will: call the route script to remove runtime routes with respect to seed prefix ranges if any; report the Error or Message in the logs; and keep monitoring the configuration changes with the configured time interval.

If the auto manage option is true and static routing is chosen, the monitor service will react as follows.

For a single POP (Centralized or Deterministic), the monitor service will: read seed prefix range, number of POP devices and runtime route configuration; call the route script to remove irrelevant runtime routes with respect to seed prefix ranges if any; configure the respective seed prefix routes with POP IPv6 address; and keep monitoring the configuration changes and repeat from the first step with the configured time interval.

For multi-POP with centralized routing, the monitor service will: read Seed Prefix Range, number of POP devices and runtime route configurations; call the route script to remove irrelevant runtime routes with respect to seed prefix ranges if any; verify the reachability of the POP devices; configure the respective Seed Prefix routes with reachable POP; keep monitoring the configuration changes & POP Device reachability; and repeat from the first step with the configured time interval.

For multi-POP with deterministic routing, the monitor service will: read seed prefix range, zone specific seed prefix ranges, number of POP devices and runtime route configurations; call the route script to remove irrelevant runtime routes with respect to seed prefix ranges if any; verify the reachability of the POP devices; verify & configure the full-length seed prefix range (/56) routes with reachable POP; remove the zone-specific routes of respective zones of unreachable POP if existing; configure the zone-specific Routes of respective zones of reachable POP if not existing; keep monitoring the configuration changes & POP Device reachability; and repeat from the first step with the configured time interval.

The E2E Topology file or files are the configuration files which have details about the nodes in the network, for example Full-Length Seed Prefix, Zone Specific Seed Prefix and Number of PoPs with Static IPv6 Addresses.

The route table manager script is the script which interacts with the underlying routing table to do CRUD (create, read, update and delete) operation on the Linux routing table so that the E2E Controller can reach the nodes in the network depending on the active POP node.

IP Addresses and the routing table are used to determine which device to send the packets to next.

The references in the flow diagram to "metric 128 routes" are an optional specific example, so that the decision block with these references may be read as simply "routes with unknown addresses?".

Figure 12A:
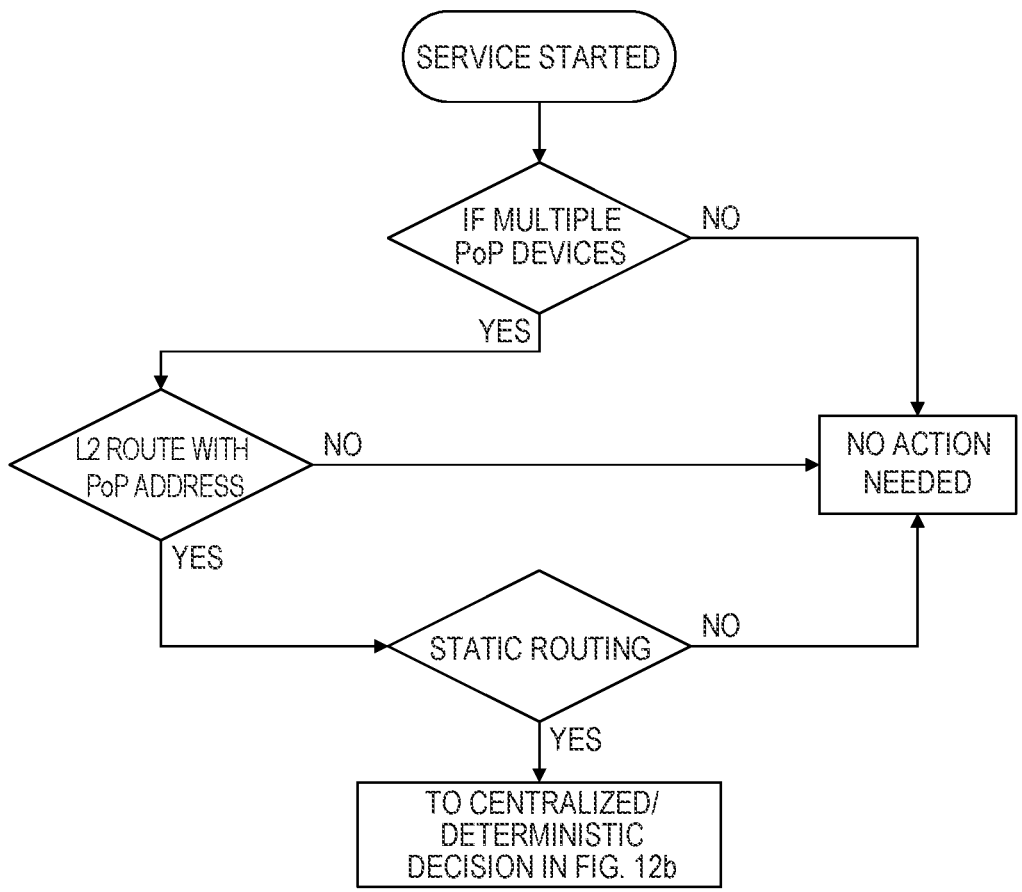
FIGS. 12a, 12b, and 12c provide a flow diagram in an example.
Figure 12B:
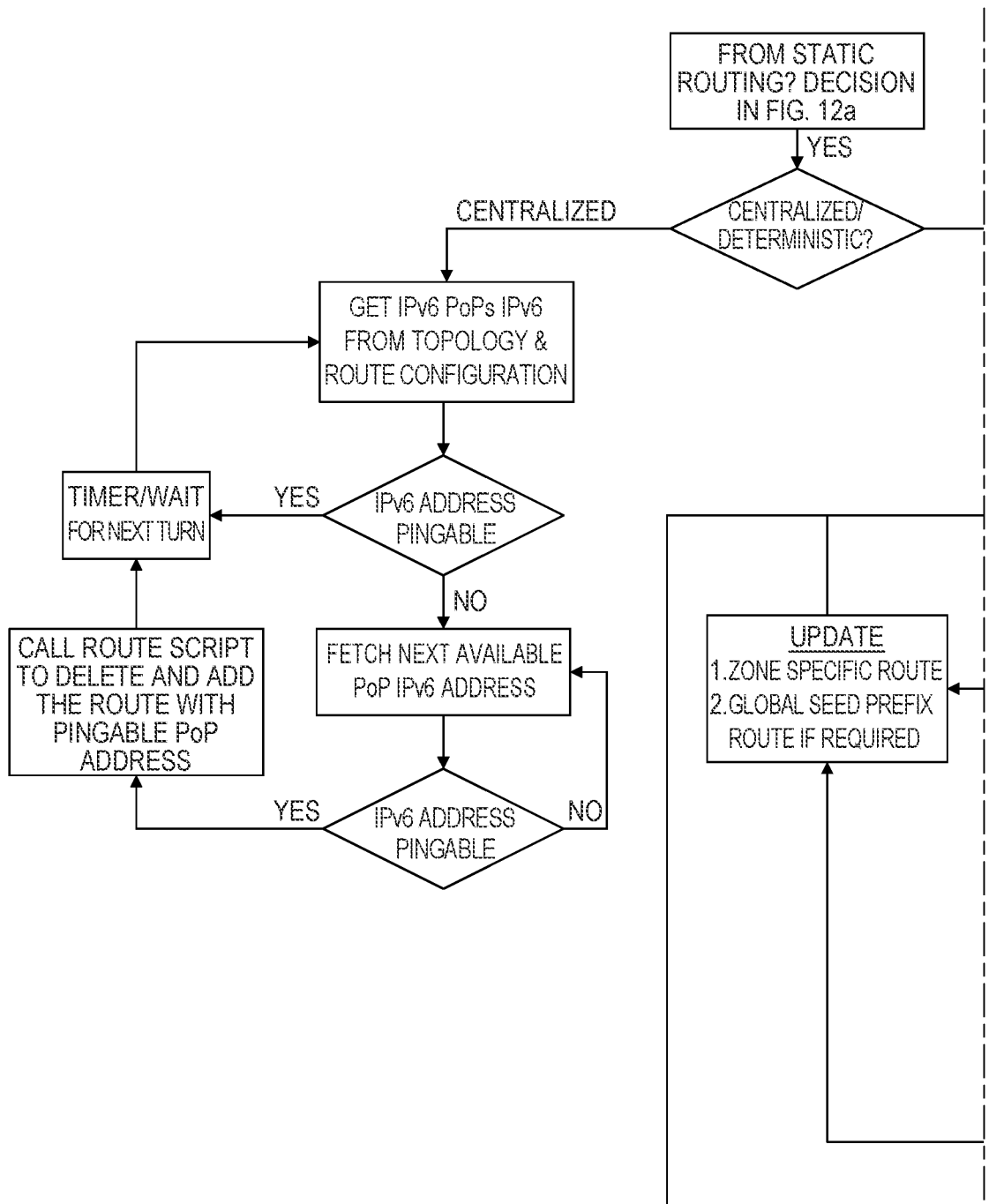
Figure 12C:
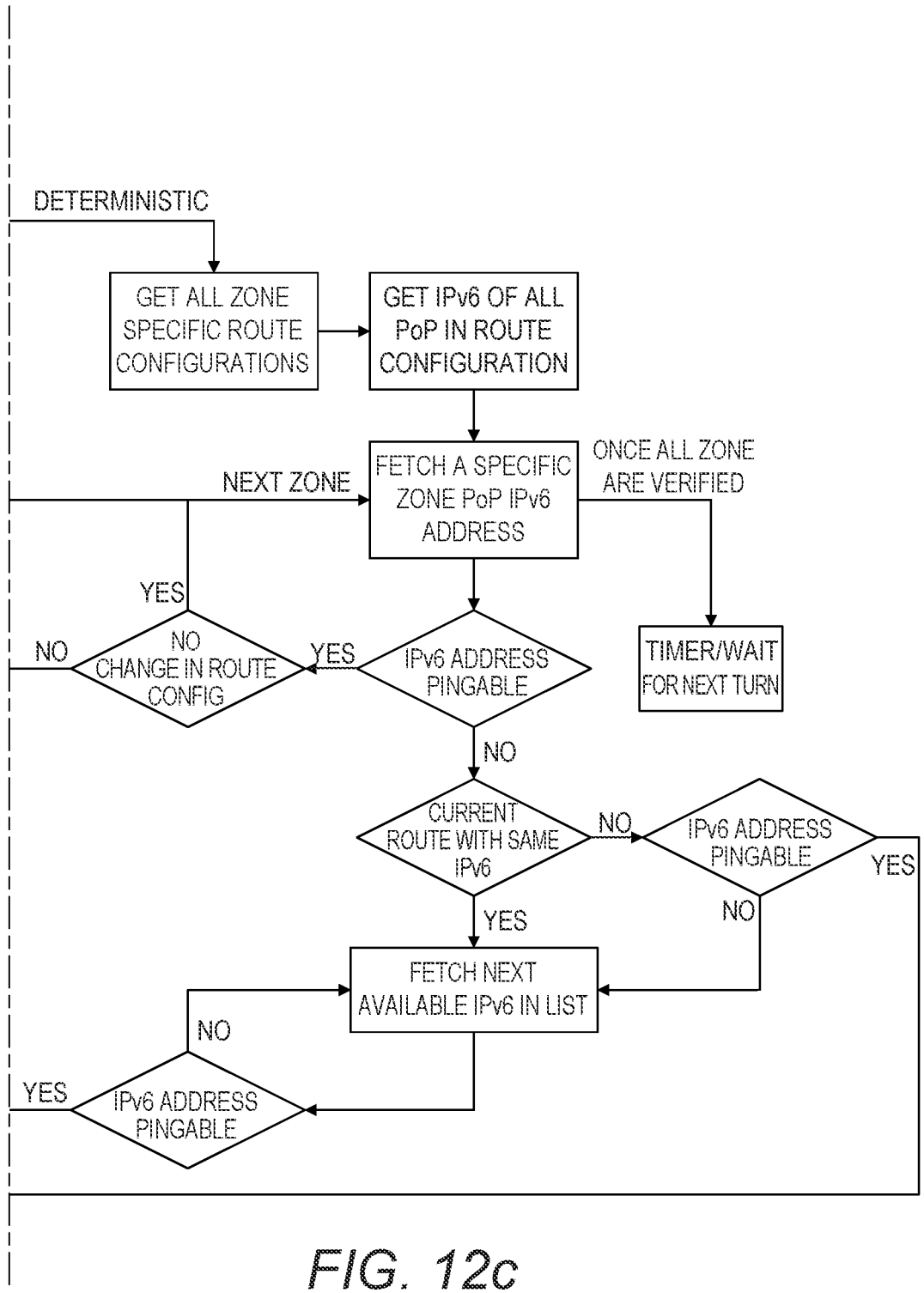

FIGS. 12a, 12b, and 12c show another example of the monitor service. The monitor service may be a daemon which runs in the background periodically pinging each POP node which is currently onboarded into the E2E Controller. The ping interval can be 5-60 seconds depending on the configuration of the service—it can be easily configured.

For Centralized with Static Routing: the external E2E Controller is typically configured with a default gateway or static route towards seed prefix via the first POP device; the monitor service keeps monitoring the POP devices with the defined intervals; and if the first POP in which the route is configured is not reachable, the monitor service will notify the route script to update the default gateway or static route towards seed prefix via the next available POP device to ensure the connectivity to underlying devices.

For Deterministic with Static Routing, the external E2E Controller is typically configured with a default gateway or static route towards full length (/56) seed prefix via the first POP device. A sub zone seed prefix ranges (/57, /58 & etc) is typically with a static route via a respective POP device in the zone. The monitor service keeps monitoring the POP devices with the defined intervals. If any POP in which the route is configured is not reachable, the monitor service will notify the route script to update the default gateway and/or static route towards seed prefix via the next available POP device to ensure the connectivity to underlying devices.

The E2E Topology file has details about the nodes in the network along with their seed prefix range. The route table manager script is the service which interacts with the underlying routing table to do CRUD operation on the Linux routing table so that the E2E Controller can reach the nodes in the network depending on the active POP node.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of routing packets in a data network comprising a wireless mesh network and a controller for the wireless mesh network, the controller being in communication with a plurality of point of presence (POP) nodes of the wireless mesh network, the controller providing management traffic having Internet Protocol version 6 (IPv6) protocol to respective nodes of the wireless mesh network, the method comprising:
    using a monitor function and a route table manager to generate a route table relating IPv6 addresses to each of the nodes of the mesh network via a respective one of the plurality of POP nodes, by:
    accessing a pre-configured topology file of the controller relating each of a plurality of IPv6 subnets to a respective POP node, each subnet relating to a respective zone of the wireless mesh network;
    determining the reachability of each of the plurality of POP nodes from the controller by means of periodically sending test messages from the monitor function to each POP and detecting acknowledgement of the test messages;
    dependent upon a determination that a POP node is not reachable, using the route table manager to dynamically amend the route table to relate the IPv6 subnet of the POP that is not reachable to the address of a POP node that has been determined to be reachable; and
    using an Open Systems Interconnection (OSI) Layer 2 network to direct the IPv6 management traffic between the controller and the respective nodes of the mesh network via the respective POP nodes according to the amended route table.

2. The method of claim 1, comprising directing the IPv6 management control traffic between the controller and the respective nodes of the wireless mesh network without the use of an external OSI Layer 3 router outside the wireless mesh network.

3. The method of claim 1, wherein each zone of the wireless mesh network corresponds to an IPv6 subnet comprises a POP node as a gateway to the respective zone, at least one distribution node and a plurality of client nodes, each zone is connected to at least one other of the zones within the mesh network, and each node in the wireless mesh network has an IPv6 address comprising a seed prefix identifying the wireless mesh network and a zone prefix identifying the respective zone, wherein the route table relates a plurality of long prefixes each comprising a seed prefix and a zone prefix to a respective POP node, and the route table relates at least one short prefix comprising a seed prefix and not a zone prefix to a default POP node, the method comprising:

dependent upon a determination that a POP node is not reachable, dynamically adjusting the route table to delete an entry relating one or more long prefixes to the POP node that is not reachable;

dependent upon a determination that the default POP node is not reachable, dynamically adjusting the route table to amend an entry relating a short prefix to the default POP node that is not reachable to instead relate the short prefix to a POP node that has been determined to be reachable; and selecting a route from the route table by selecting a longest prefix match.

4. The method of claim 1, wherein said test messages are ICMP ping messages.

5. The method of claim 1, wherein the OSI Layer 2 network used to direct the IPv6 management traffic between the controller and the respective nodes of the mesh network via the respective POP nodes comprises an OSI Layer 2 switch.

6. The method of claim 1, wherein the controller is an End to End (E2E) controller.

7. The method of claim 6, wherein the End to End controller is configured to centrally manage the wireless mesh network and communicate to the nodes of the wireless mesh network using IPv6 to send management control traffic to manage the network.

8. The method of claim 7, wherein the management control traffic comprising configuration data, control of link setup and/or tear down, and collection of performance data from nodes of the wireless mesh.

9. A system for routing packets in a data network, the system comprising a wireless mesh network, and one or more processors configured to implement a controller for the wireless mesh network, a monitor function and a route table manager, the controller being in communication with a plurality of point of presence (POP) nodes of the wireless mesh network, the controller providing management traffic having Internet Protocol version 6 (IPv6) protocol to respective nodes of the wireless mesh network, the controller being configured to:

use the monitor function and the route table manager to generate a route table relating IPv6 addresses to each of the nodes of the mesh network via a respective one of the plurality of POP nodes, by accessing a pre-configured topology file of the controller relating each of a plurality of IPv6 subnets to a respective POP node, each subnet relating to a respective zone of the wireless mesh network, determining the reachability of each of the plurality of POP nodes from the controller by means of periodically sending test messages from the monitor function to each POP and detecting acknowledgement of the test messages, and dependent upon a determination that a POP node is not reachable, using the route table manager to dynamically amend the route table to relate the IPv6 subnet of the POP that is not reachable to the address of a POP node that has been determined to be reachable; and use an Open Systems Interconnection (OSI) Layer 2 network to direct the IPv6 management traffic between the controller and the respective nodes of the mesh network via the respective POP nodes according to the amended route table.

10. The system of claim 9, comprising directing the IPv6 management control traffic is between the controller and the respective nodes of the wireless mesh network without the use of an external OSI Layer 3 router outside the wireless mesh network.

11. The system of claim 9, wherein each zone of the wireless mesh network corresponds to an IPv6 subnet comprises a POP node as a gateway to the respective zone, at least one distribution node and a plurality of client nodes, each zone is connected to at least one other of the zones within the mesh network, and each node in the wireless mesh network has an IPv6 address comprising a seed prefix identifying the wireless mesh network and a zone prefix identifying the respective zone, wherein the route table relates a plurality of long prefixes each comprising a seed prefix and a zone prefix to a respective POP node, and the route table relates at least one short prefix comprising a seed prefix and not a zone prefix to a default POP node, the one or more processors being configured to:

dependent upon a determination that a POP node is not reachable, dynamically adjust the route table to delete an entry relating one or more long prefixes to the POP node that is not reachable;

dependent upon a determination that the default POP node is not reachable, dynamically adjust the route table to amend an entry relating a short prefix to the default POP node that is not reachable to instead relate the short prefix to a POP node that has been determined to be reachable; and select a route from the route table by selecting a longest prefix match.

12. The system of claim 9, wherein said test messages are ICMP ping messages.

13. The system of claim 9, wherein the OSI Layer 2 network used to direct the IPv6 management traffic between the controller and the respective nodes of the mesh network via the respective POP nodes comprises an OSI Layer 2 switch.

14. The system of claim 9, wherein the controller is an End to End (E2E) controller.

15. The system of claim 14, wherein the End to End controller is configured to centrally manage the wireless mesh network and communicate to the nodes of the wireless mesh network using IPv6 to send management control traffic to manage the network.

16. The system of claim 14, wherein the management control traffic comprising configuration data, control of link setup and/or tear down, and collection of performance data from nodes of the wireless mesh.

17. A non-transitory computer readable storage medium storing instructions executable by one or more processors to perform a method of routing packets in a data network comprising a wireless mesh network and a controller for the wireless mesh network, the controller being in communication with a plurality of point of presence (POP) nodes of the wireless mesh network, the controller providing management traffic having Internet Protocol version 6 (IPv6) protocol to respective nodes of the wireless mesh network, the method comprising:
- using a monitor function and a route table manager to generate a route table relating IPv6 addresses to each of the nodes of the mesh network via a respective one of the plurality of POP nodes, by:
- accessing a pre-configured topology file of the controller relating each of a plurality of IPv6 subnets to a respective POP node, each subnet relating to a respective zone of the wireless mesh network;
- determining the reachability of each of the plurality of POP nodes from the controller by means of periodically sending test messages from the monitor function to each POP and detecting acknowledgement of the test messages;
- dependent upon a determination that a POP node is not reachable, using the route table manager to dynamically amend the route table to relate the IPv6 subnet of the POP that is not reachable to the address of a POP node that has been determined to be reachable; and
- using an Open Systems Interconnection (OSI) Layer 2 network to direct the IPv6 management traffic between the controller and the respective nodes of the mesh network via the respective POP nodes according to the amended route table.

18. The non-transitory computer readable storage medium of claim 17, wherein the method comprises directing the IPv6 management control traffic between the controller and the respective nodes of the wireless mesh network without the use of an external OSI Layer 3 router outside the wireless mesh network.

19. The non-transitory computer readable storage medium of claim 17, wherein each zone of the wireless mesh network corresponds to an IPv6 subnet comprises a POP node as a gateway to the respective zone, at least one distribution node and a plurality of client nodes, each zone is connected to at least one other of the zones within the mesh network, and each node in the wireless mesh network has an IPv6 address comprising a seed prefix identifying the wireless mesh network and a zone prefix identifying the respective zone,
- wherein the route table relates a plurality of long prefixes each comprising a seed prefix and a zone prefix to a respective POP node, and the route table relates at least one short prefix comprising a seed prefix and not a zone prefix to a default POP node, the method comprising:
- dependent upon a determination that a POP node is not reachable, dynamically adjusting the route table to delete an entry relating one or more long prefixes to the POP node that is not reachable;
- dependent upon a determination that the default POP node is not reachable, dynamically adjusting the route table to amend an entry relating a short prefix to the default POP node that is nost reachable to instead relate the short prefix to a POP node that has been determined to be reachable; and
- selecting a route from the route table by selecting a longest prefix match.

20. The non-transitory computer readable storage medium of claim 16, wherein the OSI Layer 2 network used to direct the IPv6 management traffic between the controller and the respective nodes of the mesh network via the respective POP nodes comprises an OSI Layer 2 switch.

\* \* \* \* \*